May 20, 1952  R. B. HOUPLAIN  2,597,798
SELF-LOCKING DEVICE
Filed July 12, 1947  2 SHEETS—SHEET 1
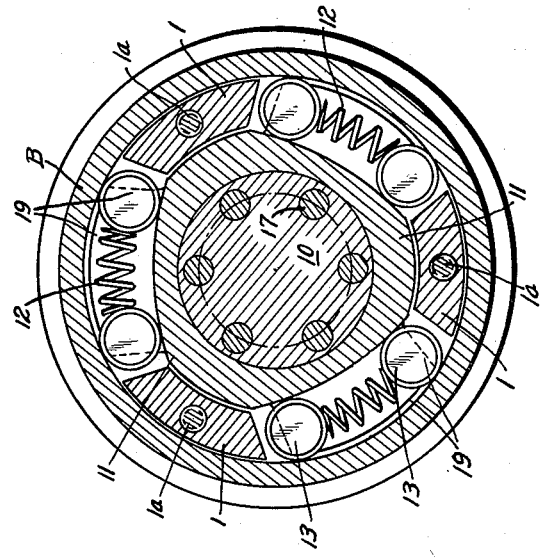
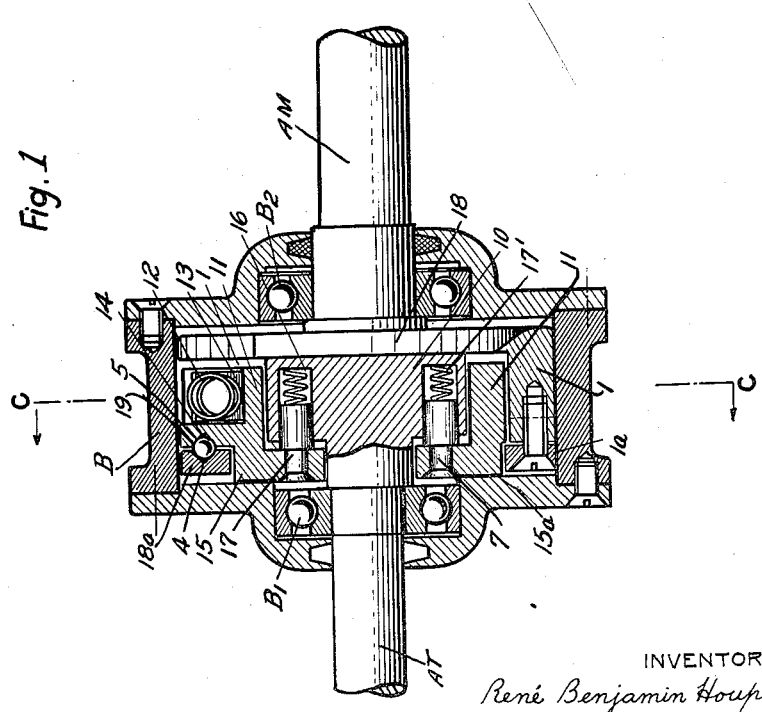
INVENTOR.
René Benjamin Houplain
BY
Dale A. Bauer
ATTORNEY.

Patented May 20, 1952

2,597,798

UNITED STATES PATENT OFFICE 2,597,798

SELF-LOCKING DEVICE

René Benjamin Houplain, Paris, France

Application July 12, 1947, Serial No. 760,522
In France January 28, 1947

5 Claims. (Cl. 192—8)

The invention relates to self-locking devices and more particularly to the self-locking devices used in the coupling between the driving and the driven members of an irreversible drive or control mechanism of variable or adjustable irreversibility.

In the known devices of this kind, the self-locking of the driven member, when ceases the actuation of the driving member, is obtained merely by the wedging of rolling members between a cammed surface and an opposed surface of reaction or by the positive locking action of bolts and consequently, in cases where the driven member is submitted to relatively high loads or reactions independent from the driving power, this locking is often very hard and these wedging members or positive bolts, which have then to bear alone these relatively heavy loads, are submitted thereby to a rapid tear and wear, and corresponding relatively high efforts are required to unwedge these rolling members or release these bolts prior to each new actuation of the driving member.

The object of the invention is to remedy this drawback and to provide a self-locking device for automatically locking a driven member, on the one hand, by means of wedging rollers located wedged between opposed ramps or slopes and a fixed reaction surface so as to realize an energetic and positive locking, and, on the other hand, by a brake of relatively large friction area comprising a movable brake member solidary of the angular movements of the driven member, but axially slidable thereon and a fixed braking surface forming part of the casing of the device or of the coupling-box of the mechanism to which the self-locking device is applied.

Other features and advantages of the present invention will appear from the following description as well as from the accompanying drawings, in which:

Fig. 1 is a longitudinal section of a self-locking device embodying the invention;

Fig. 2 is a transversal section taken on the line C—C of Fig. 1;

Figure 3:
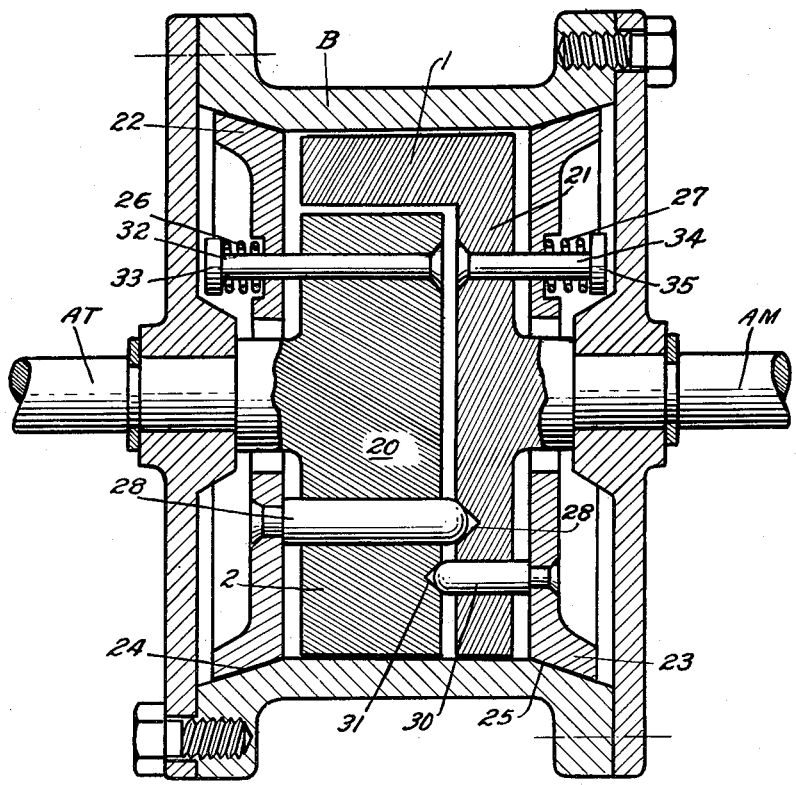
Fig. 3 is a longitudinal section, like that of Figure 1, of a second embodiment.

Referring to the drawings, a rotatable driven shaft AT is automatically locked between two consecutive operations of a rotatable driving shaft AM, on the one hand, by means of a brake and, on the other hand, by means of a wedging device acting simultaneously and conjointly with said brake. This wedging device comprises three pairs of rollers 13, freely mounted between the cylindrical inner periphery of the casing or coupling-box B and a circular cam 11 and submitted to the action of interposed springs 12 tending constantly to wedge them between this cylindrical reaction surface and the three opposed ramps of the cam 11. This latter forms part of a sleeve 15 slidably mounted on the driven shaft AT, but solidarized with the angular movements thereof by means of six pins 17 slidably mounted in corresponding holes 16 of a cylindrical head 10 of this shaft AT on the periphery of which can slide the cam 11.

The release of the wedging device and, immediately after this release has been effected, the driving of the shaft AT is accomplished by means of three segments 1 integrally formed with a disc 18 secured on the extremity of the driving shaft AM. On these segments 1 is secured by means of three screws 1a a ring 18a in which are provided a circular row of conical sockets 4. The sleeve 15 is formed with three segments 19 projecting radially between the rollers 13 and the ring 18a in the three circular spaces left between the three segments 1. In the face of the segments 19 adjacent to the ring 18a is likewise provided a circular row of conical sockets 14 normally registering with the sockets 4 to lodge a corresponding row of balls 5.

Opposite the cam 11, the sleeve 15 presents a flat annular friction surface which cooperates with a fixed braking surface formed in the left-hand flask of the casing B around the ball-bearing B₁ of the driven shaft AT to form a brake controlled by six brake-springs 17' tending constantly to press the friction surface 15a against said fixed braking surface through the intermediary of the six pins 17 when the sockets 4 and 14 register.

The operation of this device is as follows:

Between actuation of the driving shaft AM, the driven shaft is locked in its angular position, on the one hand, by the wedging of the rollers 13 between the cam 11 and the inner periphery of the casing B under the action of the springs 12, and, on the other hand, by the braking engagement of the friction surface 15a of sleeve 15 with the opposite braking surface of the left-hand flask of the casing B due to the action of the springs 17'. Thus the forces or reactions tending to rotate the shaft AT in either direction, independently from the driving shaft AM are partly absorbed by said friction, thereby relieving the load applied on the rollers 13.

As soon as the driving shaft AM starts to turn in either direction, the brake-shoe 15a is first pushed axially away from the fixed braking surface against the action of the springs 17' by the balls 5 which ride up the sides of the conical sockets 4 of the then rotating ring 18a while remaining seated in the sockets 14 of the still non-rotating sleeve 15. Immediately after this release of the brake, the segments 1 unwedge the three rollers 13 preventing the cam 11 and consequently the driven shaft AT to move in the direction of the actuation of the driving shaft AM and then meet the segments 19, thereby establishing a positive coupling between these two shafts.

Obviously the disc 18 instead of being integral with or secured to the extremity of the driving shaft AM, could likewise be mounted on the shaft AM with a small amount of axial play and be utilized to obtain a friction or braking action of the annular inner face of the right-hand flask of the casing 3 around the ball-bearing $B_2$ of the driving shaft AM. Such an arrangement is specially advantageous in all cases where the driving member is submitted to vibrations during its periods of rest. In that case, at each angular relative movement of the two shafts AM and AT, the balls 5, instead of pushing axially only the sleeve 15 toward the right of Fig. 1, will force simultaneously the ring 18a and the sleeve 15 in opposite direction, thereby releasing both left and right braking actions simultaneously.

In Fig. 3 there is shown a second embodiment in which such a double braking action is realized by the combination of two conical brake-discs 22 and 23, symmetrically arranged to cooperate with two corresponding conical braking surfaces 24, 25, respectively, formed on the inner periphery of the casing or coupling-box B. The brake-disc 22 is solidarized with the angular motion of the driven shaft AT by means of pins 32 traversing both the head of 20 of said shaft and the disc 22. These pins 32 are provided with heads 33 on which bear springs 26 tending constantly to apply the conically tapered outer edge of the disc 22 against the conical braking surface 24. The brake-disc 23 is similarly solidarized with the angular motion of the driving shaft AM by means of pins 34 traversing both the head 21 of said shaft and the disc 23. These pins 34 are provided with heads 35 on which bear springs 27 tending constantly to apply the conically tapered outer edge of the disc 23 against the conical braking surface 25.

A wedging device (not shown) similar to the one shown in Figs. 1 and 2 and comprising a cam formed on the head 20 of the driven shaft AT and rollers interposed between the segments 1 and 2 is combined with the two brakes of this embodiment.

In the brake-disc 22 is secured the countersunk heads of studs 28 traversing freely the head 20 of the driven shaft AT and terminating in semi-spheres seated normally in conical recesses 29 provided in the head 21 of the driving shaft AM.

In the brake-disc 23 is similarly secured the counter-sunk heads of studs 30 traversing freely the head 21 of the driving shaft AM and terminating in semi-spheres seated normally in conical recesses 31 provided in the head 20 of the driven shaft AT.

Thus any relative angular displacement of the driving shaft AM with respect to the driven shaft AT will release simultaneously the two brakes 22 and 23 by the action of these semi-spheres which then ride up the sides of the recesses 31, 29, respectively, and thereby spread axially apart the brake-discs 22 and 23.

The construction and details of the device may of course be changed under wide limits from the foregoing description and annexed drawings without therefore departing from the principle of the present invention.

What I claim is:

1. In a self-locking device of the type in which a driven member is normally locked between periods of actuation comprising a driving member, a coaxial driven member, a cam carried by said driven member, a fixed reaction surface surrounding said cam, spring-actuated rolling wedges working between said cam and said reaction surface and unwedging means carried by said driving member; an auxiliary brake to assist said wedging device and to relieve it in case of excessive loads applied thereon; said brake comprising a fixed brake-drum forming a continuation of the reaction surface of said wedging device; a brake-shoe mounted with a small amount of axial play on the driven member so as to be solidary of the angular movements thereof; adjustable elastic pressure means tending constantly to apply axially said brake-shoe against said brake-drum; and releasing means under the control of said driving shaft acting simultaneously and conjointly with said unwedging means to move axially said brake-shoe away from said brake-drum against the action of said pressure means upon actuation of said driving member.

2. In a self-locking device for automatically locking a driving member, the combination of a driving member, a movable member axially slidable on and rotating with said driven member, a cam shaped part on said movable member, a fixed member providing a reaction surface surrounding said cam shaped part, a plurality of wedging rollers located between said cam shaped part of the movable member and said reaction surface of the fixed member to lock said movable member and said driven member to the latter, unwedging means carried by said driving member adapted to move said wedging rollers out of said wedging position upon rotation of said driving member, means for establishing a positive coupling between said driving and said driven member, and an automatic brake to assist said self-locking device and to relieve it in case of heavy loads applied thereon, said automatic brake comprising a fixed braking surface carried by said fixed member and perpendicular to said reaction surface, a friction surface provided on said movable member parallel to said braking surface, adjustable pressure means tending to force said friction surface into braking engagement with said braking surface, and brake releasing means under control of said driving member acting simultaneously with said unwedging means to force said movable member out of engagement with said braking surface against the action of said pressure means upon rotation of said driving member.

3. A self-locking device comprising driving and driven shafts coupled by a lost motion connection, cam locking means and friction brake means for said driven shaft, said means having a common sleeve member with a cam surface and a friction braking surface, and means movable by the drive shaft to release the cam locking means and the brake means when motion is initiated by said drive shaft.

4. A self-locking device comprising driving and driven shafts coupled by a lost motion connection, a race encircling said connection, a cam race on said connection, a locking bearing jammed between said races, a braking surface adjacent said connection, a braking surface on said connection engaged with said first-named braking surface, and means movable by the drive shaft to disengage said braking surfaces and locking bearing.

5. A self-locking device comprising driving and driven shafts coupled by a lost motion connection, a brake cylinder mounted about said connection, race means on said cylinder, oppositely disposed cam means on said connection, bearings in locking engagement between said cam means and said race, means movable by the drive shaft to displace the bearings from locking position, a brake surface on the cylinder, a cooperating brake on the said connection engaged with said surface, and means movable by the drive shaft to disengage the brake from said braking surface.

RENÉ BENJAMIN HOUPLAIN.

REFERENCES CITED

The following references are of record in the file of this patent:

UNITED STATES PATENTS

| Number | Name | Date |
|---|---|---|
| 1,634,861 | Weyman | July 5, 1927 |
| 1,808,008 | Schmithals | June 2, 1931 |
| 2,447,469 | Spraragen | Aug. 17, 1948 |

FOREIGN PATENTS

| Number | Country | Date |
|---|---|---|
| 630,232 | Germany | May 23, 1936 |